April 16, 1968 R. J. ASPEEK 3,377,702
SIMPLIFIED HIGH POWER SWINGING SCRAPER TOOL
Filed April 15, 1966
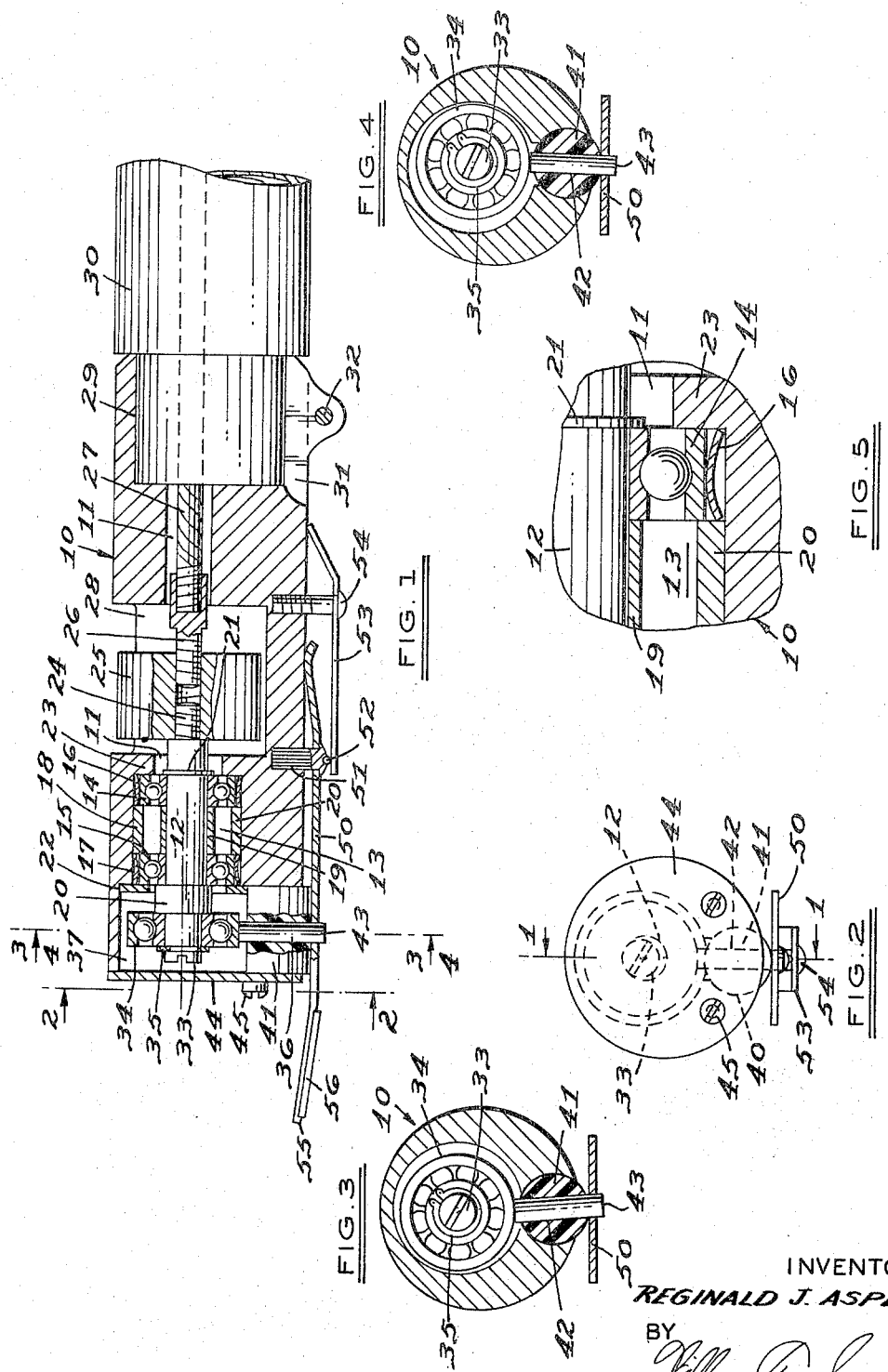
INVENTOR
REGINALD J. ASPEEK
BY
ATTORNEY 3,377,702
SIMPLIFIED HIGH POWER SWINGING
SCRAPER TOOL
Reginald J. Aspeek, 8403 Millis Road,
Utica, Mich. 48087
Filed Apr. 15, 1966, Ser. No. 542,919
7 Claims. (Cl. 30—169)

ABSTRACT OF THE DISCLOSURE

A scraping tool having a sidewise reciprocating blade driven by one end of a drive pin which is slidably and leverwise mounted in a pivotal fulcrum member with the other end of the drive pin connected to a driven oscillating member such as a non-rotating outer bearing race oscillated as by rotating inner bearing race mounted on an eccentric members such as a stub shaft on a motor driven shaft.

---

This invention relates to high speed power scraper tools particularly suitable for removing small quantities of material from metal workpieces such as machine tool slide ways, slides, base blocks, surface plates, etc. to provide minute oil cavities, reliefs, pockets, etc. for antifriction purposes.

An object of the invention is to provide a very effective tool so that a workman may remove material from a metal workpiece with ease, accurate control, and fast action.

An object of the invention is to provide a power scraper tool with improved ease of operation, increased control for accuracy, faster material removal action so that the difficulty, inaccuracy, and tediousness of a scraping job is substantially reduced.

An object of the invention is to provide a power scraper tool which is simple in design and construction, easily and inexpensively manufactured, and readily serviced, maintained, and repaired.

An object of the invention is to provide a power scraper tool which has a minimum of number of parts and very simple parts so that they may be readily made and easily assembled.

These and other objects of the invention will become apparent by reference to the following description of a power scraper tool embodying and exemplifying the invention taken in connection with the accompanying drawing, in which:

FIG. 1 is a longitudinal cross-sectional view of the tool taken on the line 1—1 of FIG. 2 and showing a handle extension in elevation and broken away.

FIG. 2 is an end elevational view of the tool shown in FIG. 1 taken on the line 2—2 thereof showing the scraper blade and actuating means in a center position of a blade stroke.

FIG. 3 is a view similar to FIG. 2 showing the blade and actuating means at one side position of blade stroke.

FIG. 4 is a view similar to FIGS. 2 and 3 showing the blade and actuating means at the other side of the blade stroke; and FIG. 5 is an enlarged fragmentary view of the bearing mounting location of FIG. 1.

Referring now to the drawing wherein like numerals refer to like and corresponding parts throughout the several views, the novel high speed power scraper tool embodying the invention disclosed therein to illustrate the invention comprises a body 10. The body 10 may be cylindrical as shown or be shaped otherwise as desired. The body 10 has an internal channel 11. A shaft 12 lies in the channel 11. An enlarged annular cavity 13 is formed in the channel 11. Paired bearings 14 and 15 lie in the cavity 13 and rotatably support the shaft 12. Springs rings 16 and 17 floatingly support the bearings 14 and 15 respectively for dynamic balancing. An annular outer spacer 18 separates the outer races of the bearings 14 and 15. An annular inner spacer 19 separates the inner races of the bearings 14 and 15. A head 20 on the shaft 12 abuts the bearing 15 and a snap-ring 21 on the shaft 12 abuts the bearing 14 positioning the shaft 12 axially. A snap-ring 22 holds the shaft and bearings against the housing wall 23. The shaft 12 is thus rotatably positioned.

The shaft 12 has a reduced threaded inner end 24. A flywheel 25 is threaded on the shaft inner end 24. A coupling 26 is threaded in the flywheel 25. A flexible drive shaft 27 is threaded in the coupling 26. The channel 11 has an enlarged cavity 28 in the location of the flywheel 25. The body 10 has a rear socket 29. The handle or extension 30 fits in the socket 29. The body 10 is split at 31. A clamp bolt compresses the body 10 on the handle 30 securing them together. The shaft 12 is thus rotatably driven by the drive cable 27.

A stub shaft 33 is eccentrically positioned on the head 20 of the shaft 12. A bearing assembly 34 is mounted on the stub shaft 33. The inner race of the bearing assembly 34 is tight on the stub shaft 33, rotates therewith, and is held thereon by a snap ring 35. A lever drive pin 36 extends from the outer face of the bearing assembly 34. The channel 11 has an enlarged cavity 37 housing the bearing assembly 34 opening through the end of the body 10. The outer race does not rotate but rather oscillates as hereinafter more fully set forth.

The body 10 has an arcuate walled cavity 40 below the enlarged cavity 37. The arcuate wall cavity 40 communicates with the enlarged cavity 37. The arcuate wall cavity 40 also interrupts the body 10 outer wall. An arcuate sided bearing fulcrum member 41 lies in the curved walled cavity 40. The member 41 has a transverse bore 42 radially of the stub shaft 33. The lever drive pin 36 lies in the bore 42 of the member 41 and extends outwardly of the member 41 in a terminal end 43. A cover plate 44 holds the member 41 in the body 10. Screws 45 secure the cover plate 44.

A blade 50 lies along the body 10. The blade 50 has a pivot stud 51 secured thereto. The pivot stud 51 lies in an aperture in the body 10. The pivot stud 51 head has a dimple. A ball 52 lies in the dimple. A clamp bar 53 lies over the ball 52. A screw 54 secures the clamp bar 53 to the body 10. The blade 50 is thus pivotally supported on the body 10. The blade has a scraper end 55 extending beyond the end of the body 10. Carbide inserts 56 may be mounted in the blade 50. The blade 50 has an aperture 57 receiving the terminal end of the lever drive pin 36. The lever drive pin 36 drives the blade 50 in a sidewise scraping motion as hereinafter more fully set forth.

The lever drive pin 36, FIGS. 1 and 2, is shown radially of the shaft 12 with the eccentric stub shaft 33 radially aligned with the drive pin 36 and at its "upper" position of radial alignment. In this position the stub shaft 33 and drive pin 36 are in an elevated "upper" position relative to the blade 50. With the shaft 12 rotated 180° from that seen in FIGS. 1 and 2, the drive pin 36 and stub shaft 33 are again radially aligned but they are at their "lower" position of radial alignment. In this later position the stub shaft 33 and drive pin 36 are in a dropped "lower" position relative to the blade 50. It will be understood that the drive pin 36 slides axially relative to the blade 50 and also slides axially relative to the fulcrum bearing member 41 between these two upper and lower positions.

FIGS. 3 and 4 show the stub shaft 33 at positions 90° from the position seen in FIGS. 1 and 2 and on either side thereof. In FIG. 3 it will be noted that the stub shaft 33 is at one side and in FIG. 4 that the stub shaft 33 is at the other side and that these side positions are 180° apart. It is also to be noted that the drive pin 36 in FIG. 3 has pivoted on the fulcrum member 41 and that its terminal end 43 has swung to the right moving the blade 50 to the right. It is to be further noted that the drive pin 36 in FIG. 4 has pivoted on the fulcrum member 41 and that its terminal end 43 has swung to the left. The motion of the drive pin terminal end 43 between the positions seen in FIGS. 3 and 4 moves the blade 50 back and forth in its side-wise scraping stroke. It will be understood that the fulcrum member 41 pivots with the drive pin 36 relative to the body 10.

A high speed motor is connected to the flexible shaft 27 and the stub shaft 33 thus rotates rapidly in an accentric path moving the drive pin 36 rapidly between and through the described positions so that the blade is rapidly reciprocated from side to side. The distance over which the blade 50 is reciprocated may be very small or relatively large as indicated. Usually the blade travel from side to side is very small relative to that indicated.

The novel scraper may be driven at relatively high speeds such as 10,000 to 20,000 r.p.m. of the shaft 12 so that the blade 50 is very rapidly reciprocated providing fast material removal, ease of handling, and accurate control.

While only a single embodiment of the invention has been shown and described in detail, it is obvious that many changes may be made in the size, shape, detail, and arrangements of the various elements of the invention within the scope of the appended claims.

I claim:
1. A high speed power scraper tool comprising
a body having an internal channel,
a shaft rotatably supported in said body channel,
an eccentric stub shaft on said shaft,
a bearing assembly on said stub shaft including a rotating inner race fixed on said stub shaft, a non-rotating outer race surrounding said inner race, and bearings between said races;
said body having an arcuate sided cavity adjacent said channel and said outer bearing race,
an arcuate sided fulcrum-bearing member located in said body arcuate sided cavity; said fulcrum bearing member having a transverse bore; said member being movable angularly relative to said body;
a lever drive pin fixed on said outer race extending radially therefrom and leading through said fulcrum bearing member transverse bore and projecting beyond said member in a terminal end,
a blade pivotally mounted on said body having an aperture receiving said terminal end of said drive pin; and
drive means in said body for rotating said shaft;
said stub-shaft, races, and drive pin moving eccentrically upon rotation of said shaft;
said drive pin sliding back and forth axially in said fulcrum bearing member and swinging angularly from side to side in its eccentric movement moving said fulcrum bearing member angularly;
said fulcrum bearing member providing a fulcrum for said drive pin in its side to side movement so that said terminal end of said drive pin leverwise swings back and forth sideways to move said blade back and forth sideways in a scraping motion.

2. In a device as set forth in claim 1, a fly wheel in said body on said shaft damping vibration of said blade on said shaft and vibration of said drive means in said body on said shaft.

3. In a device as set forth in claim 1, paired bearing assemblies supporting said shaft, and spring rings resiliently supporting said bearing assemblies so that said shaft may assume a position of dynamic balance during high speed rotation.

4. In a device as set forth in claim 1, paired bearing assemblies supporting said shaft, spring rings resiliently supporting said bearing assemblies so that said shaft may assume a position of dynamic balance during high speed rotation, and a flywheel on said shaft providing said shaft with added dynamic balancing mass.

5. In a device as set forth in claim 1, said fulcrum bearing member being made of anti-friction material such as Teflon so that its angular movement relative to said body and said lever drive pin movement relative to said member do not require lubrication.

6. In a device as set forth in claim 1, said blade resting and bearing against said fulcrum bearing member with the angular movement of said member with said drive pin and the side-to-side movement of said blade with said drive pin coordinated in the same direction so that the relative movement of said blade relative to said body is absorbed without friction by said member and blade moving together.

7. In a device as set forth in claim 1, said blade having a dimple at said pivotal mounting with said body,
a ball lying in said dimple, and a clamp bar held in pressed engagement with said ball thereby holding said blade relative to said body with a minimum of friction at said pivot point.

References Cited

UNITED STATES PATENTS

| 2,503,539 | 4/1950 | Aspeck | 15—93 X |
| 2,874,946 | 2/1959 | Singleterry et al. | 15—93 X |
| 2,912,706 | 11/1959 | Gerecke et al. | 15—22 |
| 2,933,800 | 4/1960 | Friden | 15—22 X |

FOREIGN PATENTS

| 929,976 | 7/1947 | France. |
| 1,273,330 | 8/1961 | France |
| 995,823 | 6/1965 | Great Britain. |

CHARLES A. WILLMUTH, *Primary Examiner.*

LEON G. MACHLIN, *Examiner.*